United States Patent [19]

Giustino

[11] 4,445,812
[45] May 1, 1984

[54] BOLT ANCHOR ESPECIALLY FOR USE IN HARD MATERIALS

[76] Inventor: John Giustino, 21 Willow Rd., Menlo Park, Calif. 94025

[21] Appl. No.: 317,740

[22] Filed: Nov. 3, 1981

Related U.S. Application Data

[63] Continuation of Ser. No. 94,442, Nov. 15, 1979, abandoned.

[51] Int. Cl.³ ............................................. F16B 13/10
[52] U.S. Cl. ......................................... 411/57; 411/74
[58] Field of Search ....................... 411/57, 58, 44, 24, 411/71, 15, 21, 74, 33

[56] References Cited

U.S. PATENT DOCUMENTS

| 1,031,462 | 7/1912 | Paine | 411/57 |
| 2,760,399 | 8/1956 | Rea | 411/57 |
| 2,771,746 | 11/1956 | Fischer et al. | 411/385 |
| 3,874,264 | 4/1975 | Polos | 411/57 |

FOREIGN PATENT DOCUMENTS

| 453942 | 1/1949 | Canada | 411/57 |
| 91090 | 12/1937 | Sweden | 411/33 |
| 121053 | 3/1948 | Sweden | 411/24 |
| 249079 | 3/1948 | Switzerland | 411/74 |
| 346785 | 7/1960 | Switzerland | 411/58 |
| 343992 | 3/1931 | United Kingdom | 411/24 |

Primary Examiner—Ramon S. Britts
Attorney, Agent, or Firm—Thomas Schneck

[57] ABSTRACT

An anchor which is internally threaded for securing a bolt within a ledged hole in a hard material. The upper portion of the anchor has longitudinal slits dividing the top of the anchor into circumferentially spaced segments having a shape such that the segments can be bent outwardly. The outermost portion of a segment has a tip for engaging a portion of the ledge to prevent anchor rotation. A tubular body placed immediately above the outwardly bent segments provides lateral support for a bolt secured by the anchor and applies pressure against the segments, helping keep the anchor in place.

6 Claims, 13 Drawing Figures

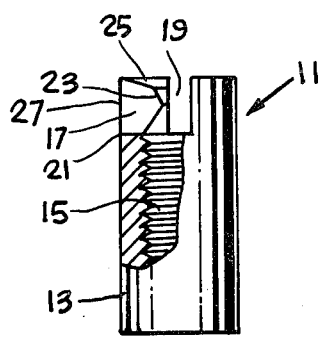
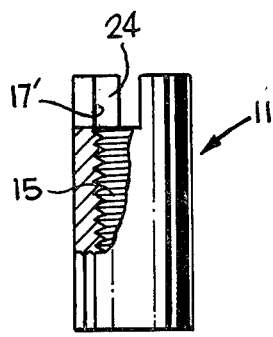
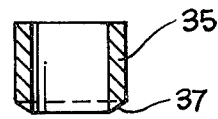
Fig.1  Fig.1a  Fig.3
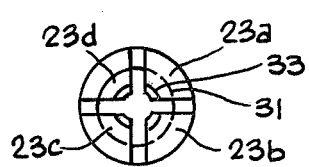
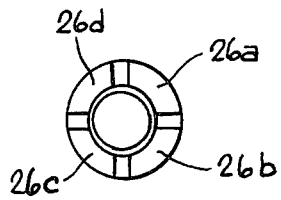
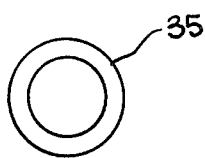
Fig.2  Fig.2a  Fig.4
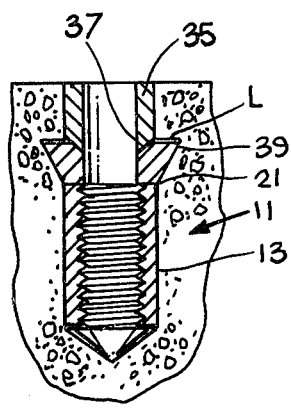
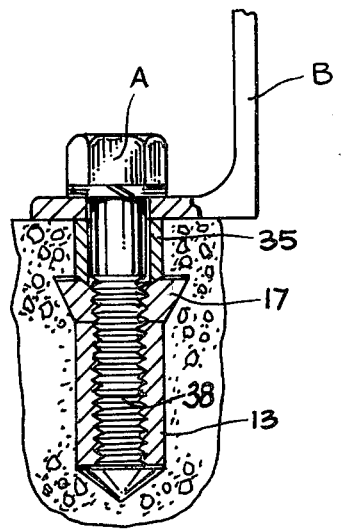
Fig.5  Fig.6

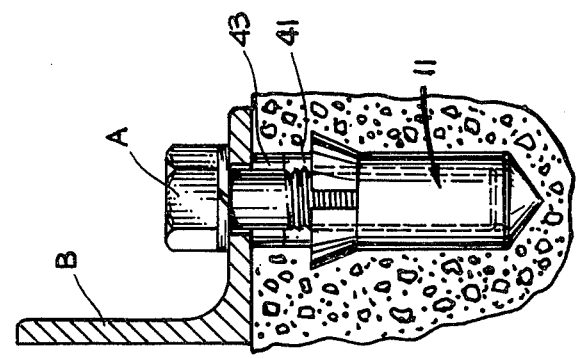
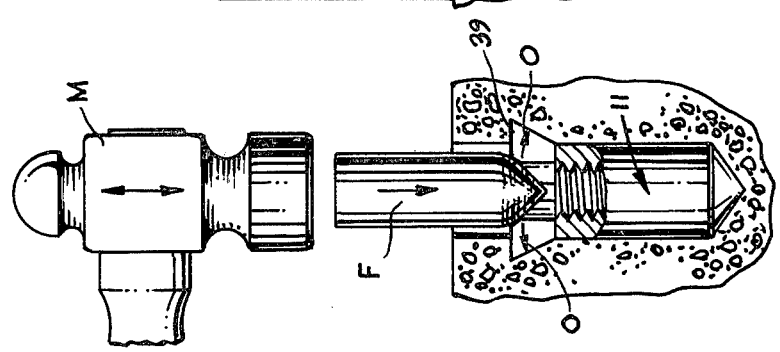
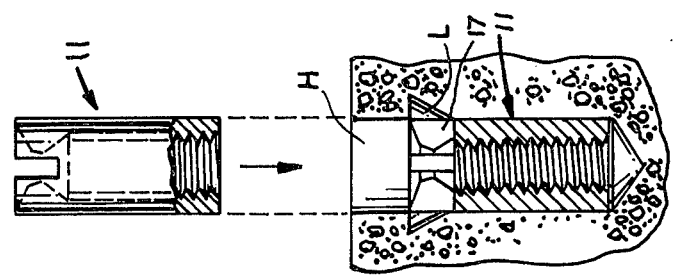
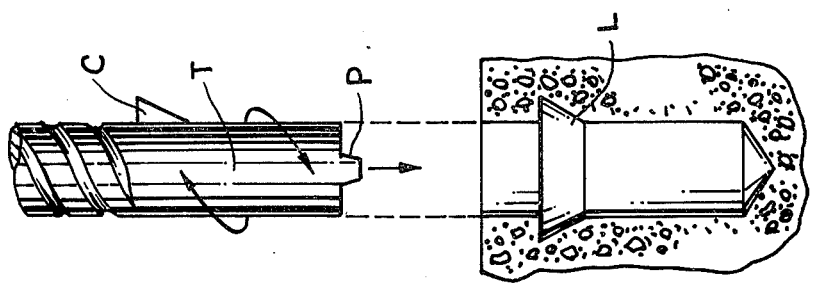
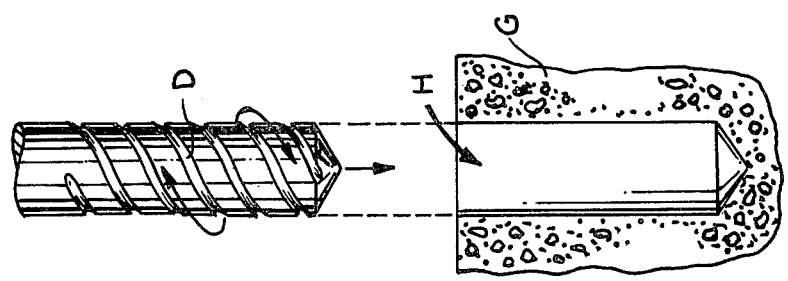

BOLT ANCHOR ESPECIALLY FOR USE IN HARD MATERIALS

This is a continuation of application Ser. No. 94,442, filed Nov. 15, 1979, now abandoned.

BACKGROUND OF THE INVENTION a. Field of the Invention

The invention relates to in-situ anchors for use primarily in static structures. More particularly, the invention relates to a threaded anchor to be used in a blind hole in hard materials.

b. Prior Art

Previously, others have devised anchors which secure bolts in materials by means of internal threads. Some such anchors are held in place by outward expansion of at least a portion of the anchor. For example, in U.S. Pat. No. 3,171,321 granted Mar. 2, 1965, A. Fischer teaches an anchor for a blind hole which is longitudinally split at the inward end, but with the inward end otherwise solid. A screw which is driven into the anchor forces the split portion outwardly and into firm contact with walls of the hole in which the anchor is placed. The anchor material is plastic and undergoes some compression against the wall, holding the screw in place.

In U.S. Pat. No. 4,044,647 granted Aug. 30, 1970 to K. Takahashi an anchor is disclosed which is internally threaded and having split sides at the inward end of the anchor. The bottom of the anchor is partially closed, but having a central conical opening communicating with the longitudinal slit. A spreading tool is carried by the anchor and on insertion of the anchor into a hole the spreading tool is carried forward and pushed into the conical opening, thereby spreading the inward end of the anchor, securing it in position.

In U.S. Pat. No. 4,135,432 granted Jan. 23, 1979 to R. Schalge and G. Neos there is a disclosure of an anchor having a longitudinally slit inward end having an annular collar at the inward end intended to fit within a ledge or undercut portion of a hole. The anchor carries an expansion pin in a slightly withdrawn, central region of the anchor prior to expansion of the anchor. To expand the anchor, the expansion pin is pushed forwardly, toward the inward end of a hole, thereby causing expansion of the anchor on opposite sides of the longitudinal slit. The collar at the inward end of the anchor is intended to reside in the undercut or ledged portion of the hole, thereby securing the anchor.

In U.S. Pat. No. 3,815,694 granted June 11, 1974 to J. Giustino there is disclosed a tool for drilling a ledged hole in hard materials. The tool carries an internal blade which is pivoted outwardly as the tool is pressed into the hole. The patent shows that ledged holes are useful for holding toggle type fasteners.

While many of the anchors of the prior art, including those discussed above, are useful in concrete and wood, they are not particularly suitable for use in granite, with the possible exception of the patent to Schalge and Neos. This is because the prior art expanding anchors rely upon the softness or crumbling property of the material into which the anchor is inserted. For example, concrete is an aggregate material consisting of sand, rock and cement particles. Many prior art anchors are successful in cement because they displace or compress aggregate materials. However, this approach is not possible in hard materials such as granite. When a hole is drilled in such hard materials, the drilling process polishes the sidewalls of the hole. This is in contrast to concrete and similar materials which crumble on contact.

Accordingly, there is a need for an anchor which is especially suited to hard materials, such as granite.

SUMMARY OF THE INVENTION

An object of the invention has been to devise an anchor which is especially adapted for use in hard materials.

The above object has been achieved with an expandible anchor which is adapted for use in a ledged hole. In contrast to the prior art, the expandible portion of the anchor is not at the inward end, but at the outward end, permitting use of a removable expansion tool.

The anchor has an elongated cylindrical body with internal threads in a lower portion of an axial bore into the body. The upper portion of the body has longitudinal slits defining segments which are connected to the lower portion of the body after they are bent outwardly by impact with a flaring tool. The segments are designed so that on outward bending they will be wedged into an annular ledge, preferably filling a good portion of the cross section of the ledge, thereby achieving an interlocking fit with the ledge. An annular sleeve may be placed in the hole from the top of the annular segments outwardly to the top of the hole to provide lateral stability, or an anti-wobble characteristic, to bolts inserted into the inward threaded portion of the anchor. A bolt screwed tightly into the anchor forces this sleeve to apply pressure against the outwardly bent segments, wedging the anchor body tightly in place.

BRIEF DESCRIPTION OF THE DRAWINGS

FIGS. 1 and 1a are partially cutaway side views of cylindrical bodies used in an anchor of the present invention.

FIGS. 2 and 2a are top views of the cylindrical bodies of FIGS. 1 and 1a.

FIG. 3 is a side sectional view of a tubular member for mounting above the cylindrical body of FIG. 1 for the purpose of providing lateral stability to a bolt seated in the body of FIG. 1.

FIG. 4 is a top view of the tubular member shown in FIG. 3.

FIG. 5 is a side sectional view of the cylindrical body of FIG. 1 in place within a hole, together with the tubular member of FIG. 3 placed atop.

FIG. 6 is a side sectional view of the cylindrical body of FIG. 5 in a hole, with a bolt securing a member.

FIGS. 7-11 show the manner of inserting the body of FIG. 1 and the tubular member of FIG. 3 in a hole for securing a bolt, as in FIG. 6.

DESCRIPTION OF THE PREFERRED EMBODIMENT

With reference to FIG. 1, an elongated cylindrical body 11 is shown which has a generally uniform outside diameter prior to expansion. This diameter is intended to fit snugly into a blind ledged hole. The cylindrical body 11 has a lower portion 13 into which an axial bore 15 extends partially or completely through in the axial or lengthwise direction. The lower portion has internal screw threads of a desired type facing inwardly for mating with corresponding threads on a bolt to be secured within the anchor. The anchor of the present invention permits use of standard bolts and may be distinguished from certain prior anchors which require special bolts. The bore 15 has an upper portion 17 defined by the length of longitudinal slits, such as slit 19 which divides the upper portion into a plurality of segments. The wall thickness and cross sectional shape of the segments is such that the segments can be bent radially outwardly on impact with a tool at the region of connection 21 between the segments and the lower portion.

A preferred cross sectional shape for the segments is an inwardly extending hump with an inward apex 23. The hump has a wall portion 25 which extends inwardly from the top of exterior wall 27, i.e. the end of the exterior wall which is distal to the lower body portion 13. The segment wall portion 25 generally, but not necessarily, extends inwardly further than the threads 15.

In the alternate embodiment of FIG. 1a, the segment of upper portion 17' has an interior wall which does not extend inwardly further than the threads 15. The furthest inward extent of the interior wall of the segments is indicated by the dashed line 24.

The difference between the embodiments of FIGS. 1 and 1a is that the annular hump of FIG. 1, upon outward rotation which is described below with reference to FIG. 10, substantially fills the cross section of an annular ledge within a hole. On the other hand, the segments of FIG. 1a, while not filling the ledge, may still form outwardly extending wedges upon radial expansion of the segments which lock the cylindrical body 11' in place.

With reference to FIG. 2, four inwardly humped segments 23a, 23b, 23c and 23d may be seen. The outermost extent of the threads of the axial bore is indicated by the dashed line 31, while the innermost extent is indicated by the dashed line 33. The humped segments join the threads at the top of the threads, in a valley, such as a valley indicated by the dashed line 31. In FIG. 2a, the segments 26a, 26b, 26c, 26d have a generally straight interior wall with an inside diameter which is slightly greater than the thread diameter in the lower body portion, just large enough for a bolt to pass through.

FIG. 3 shows a tubular member 35 of the same outside diameter as the cylindrical body 11 shown in FIG. 1. The purpose of the tubular member 35 is to provide support for the upper portion of the shank of a bolt so that it will not wobble in the space above the cylindrical body 11. In order that the tubular member 35 can assist in securing the cylindrical body 11 in place, the lower peripheral region 37 is tapered in order to make contact with the outwardly turned or bent segments of the top portion of the cylindrical body. FIG. 4 shows a top view of the tubular member 35, showing that it is not segmented. More than one tubular member may be used. The number to be used is any number which will fill the space between the top of the outwardly expanded cylindrical body 11 and the top of the hole in which the body is inserted.

FIG. 5 shows the body 11 in position in a hole which has been drilled in granite. The segments of upper portion 17 have been bent outwardly about region 21 so that the hump region of FIG. 1 in cross section fills a ledge, L, within the hole. The tubular member 35 is positioned above the cylindrical body with the lower portion 37 resting against a heel of the hump segment, tending to push the segment outwardly against the ledge.

It should be noted that the hump segment has a wedge shaped point 39. It is important that this point be pushed outwardly to prevent the anchor from rotating. If rotation occurs, a bolt cannot be advanced inwardly or cannot be retracted. Often the ledge will not precisely match the cross sectional shape of a segment projecting into the ledge. While it is desirable to have cross sectional matching of an outwardly bent segment and the ledge, it is not necessary. The two qualities which the outwardly bent segment should have are: (1) the ability to prevent the cylindrical body 11 from being withdrawn and (2) the ability to prevent the cylindrical body from being rotated. The segments of upper body portion 17 of FIG. 1 and 17' of FIG. 1a both satisfy these conditions.

FIG. 6 shows the anchor assembly of FIG. 5 with a bolt A securing a bracket B. The bolt extends only to region 38 of the bore in lower body portion 13, although the threaded region of the lower body portion 13 extends almost to the bottom of the bore. Obviously, it is not necessary that the bore extend all the way to the bottom, but only as far as region 38.

The bracket B applies downward or inward pressure on tubular member 35 as the bolt A is tightened by screwing inwardly. Tubular member 35 transmits inward pressure to the outwardly bent segments of upper body portion 17. In this manner, the bolt A cooperates with the anchor by helping retain it in place. This is in contradistinction to many prior art anchors in which the bolt tends to loosen the anchor.

The cylindrical body may be made of any material which is strong enough to secure a bolt without the threads giving way. Usually, the preferred material will be steel or aluminum or a comparable alloy. The tubular member 35 may be a hard plastic material or metal.

The method of using the anchor of the present invention may be seen with reference to FIGS. 7–11. In FIG. 7, a hole, H, is drilled in a hard material such as granite G using a drill D. The length of the hole is at least as long as the size bolt to be used in the hole. The hole is usually a blind hole, i.e. one which does not penetrate the material.

FIG. 8 illustrates the creation of a ledge, L, near the outward end of the hole. The ledge should be sufficiently inside of the hole to preclude fracture of the material above the ledge by outward forces on the bolt. The ledge is created by means of a ledging tool T which is described in U.S. Pat. No. 3,815,694, or by comparable means. The tool has a blade C which is forced outwardly by pivotal action as a forward tip P of the tool pushes against the inward end of the hole.

In FIG. 9 the cylindrical body 11, shown in FIG. 1, is inserted in hole H so that the humped segments of upper body portion 17 are disposed in the vicinity of the ledge L. This will permit subsequent outward expansion of the hump segments into the ledged region.

In FIG. 10, the flaring tool F, having a conical point, is placed over the center of the cylindrical body 11. A mallet M applies an impact to the flaring tool which transfers the impact to the center of the humped segments of upper body portion 17 causing outward bending of the segments with rotation in the direction indicated by the arrows O. The impact on the flaring tool F should be sufficient to drive the segment 17 fully outwardly, causing the point 39 of each segment to be driven against the ledge wall, thereby securing the cylindrical body 13 in place. The flaring tool 13 is removed and one or more tubular members 41, 43 are spaced above the annular body 13. A bolt A is now used to secure a member, such as the bracket B in place. The bolt cooperates with the anchor by keeping it in place when the bolt is tightly screwed in.

I claim:

1. An expandable anchor for use in a blind hole having an annular ledge a predetermined distance from the blind end comprising, an elongated cylindrical body for insertion in a blind hole with an annular ledge, and having an axial bore with axially facing screw threads in a lower portion of the bore and with an annular axially facing solid hump in an upper section of the bore, said annular solid hump extending inwardly further than said screw threads constricting the bore, denying entry of a screw therein, and segmented by a plurality of slits, said annular hump segments having a connection to said lower bore portion which permits rotation of said hump segments radially outwardly, the outside diameter of said cylindrical body snugly fitting within a ledged hole such that said hump segments may be disposed adjacent to the ledge of said ledged hole, the cross section of said rotated hump segments substantially filling the cross section of said ledge and having a pointed region which, after hump outward rotation, faces said ledge and may be forced against said ledge for opposing turning or withdrawal of the cylindrical body from the axial bore.

2. The anchor of claim 1 further defined by a tubular member having an outside diameter equal to the outside diameter of said elongated cylindrical body and having an inside diameter slightly greater than said threads, the length of said tubular member being such that the sum of the lengths of said tubular member and said cylindrical body with said hump segments rotated radially outwardly substantially occupies said blind ledged hole.

3. The anchor of claim 1 wherein the cross section of the pointed region of said hump generally corresponds to the cross section of the ledge.

4. An expandable anchor for use in a blind hole having an annular ledge a predetermined distance from the blind end comprising, an elongated cylindrical body having an axial bore with an upper body portion and a lower body portion, said lower portion having an outside diameter fitting snugly into a blind ledged hole and having an interior wall surface with screw threads of a desired type, said upper portion having an outside diameter equal to the outside diameter of said lower portion and having an interior wall which extends inwardly from an end of the exterior wall of said upper portion distal to the lower portion further than said threads to an apex region and then curves inwardly joining said threads, thereby forming a hump, said upper hump portion segmented by a plurality of slits, said slits sufficient in number and size to permit hump segments of said upper portion to rotate radially outwardly into the ledge of said hole, the cross section of said outwardly rotated hump segments substantially filling the cross section of the ledge, whereby outward rotation of said hump segments locks said cylindrical body in place.

5. The anchor of claim 4 further defined by a tubular member having an outside diameter equal to the diameter of said elongated cylindrical body and having an inside diameter slightly greater than said threads, the length of said tubular member being such that the sum of the lengths of said tubular member and said cylindrical body with said hump segments rotated radially outwardly substantially occupies said blind ledged hole.

6. The anchor of claim 4 wherein the end of the exterior wall of the upper portion of said cylindrical body, distal to the lower portion, forms, in cross section, a wedge point with the interior wall thereof.

* * * * *